(12) United States Patent
Hoisington et al.

(10) Patent No.: US 6,906,534 B2
(45) Date of Patent: Jun. 14, 2005

(54) BREATHABLE MOISTURE BARRIER FOR AN OCCUPANT SENSING SYSTEM

(75) Inventors: Mark A. Hoisington, Austin, TX (US); David V. Mahoney, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 139 days.

(21) Appl. No.: 10/196,997

(22) Filed: Jul. 16, 2002

(65) Prior Publication Data

US 2003/0094959 A1 May 22, 2003

Related U.S. Application Data

(60) Provisional application No. 60/332,077, filed on Nov. 20, 2001.

(51) Int. Cl.[7] ................... G01R 27/08; G08B 13/26
(52) U.S. Cl. .................................. 324/694; 340/561
(58) Field of Search ..................... 324/663, 687, 324/658, 694, 693, 691, 645, 600; 428/71, 156, 172, 500, 315.9; 264/288.8, 41, 48; 73/73, 24.04, 25.04, 29.01, 29.02; 442/394; 701/45, 49; 340/561, 602; 5/713, 484, 654; 236/44 A, 44 C, 44 R; 297/180.1, 180.12, 180.13, 180.14, 180.16

(56) References Cited

U.S. PATENT DOCUMENTS

| | | | |
|---|---|---|---|
| 3,914,982 A | | 10/1975 | Zanetti |
| 4,539,256 A | | 9/1985 | Shipman |
| 4,726,989 A | | 2/1988 | Mrozinski |
| 4,902,553 A | | 2/1990 | Hwang et al. |
| 5,238,623 A | | 8/1993 | Mrozinski |
| 5,249,320 A | * | 10/1993 | Moretz et al. ............... 5/484 |
| 5,275,589 A | * | 1/1994 | Bozich ...................... 604/373 |
| 5,565,254 A | * | 10/1996 | Norvell ....................... 428/71 |
| 5,914,610 A | | 6/1999 | Gershenfeld et al. |
| 5,934,748 A | * | 8/1999 | Faust et al. ............ 297/180.12 |
| 5,936,412 A | | 8/1999 | Gershenfeld et al. |
| 5,983,147 A | * | 11/1999 | Krumm ........................ 701/45 |
| 6,045,900 A | * | 4/2000 | Haffner et al. ........... 428/315.9 |
| 6,116,778 A | * | 9/2000 | Faust et al. ................ 374/109 |
| 6,171,689 B1 | | 1/2001 | Kaytor et al. |
| H002011 H | * | 1/2002 | Freiburger et al. ......... 604/381 |
| 6,392,542 B1 | * | 5/2002 | Stanley ....................... 340/561 |
| 6,490,515 B1 | * | 12/2002 | Okamura et al. ............ 701/49 |
| 6,555,766 B2 | * | 4/2003 | Breed et al. ................. 701/45 |
| 6,677,258 B2 | * | 1/2004 | Carroll et al. ............. 442/394 |
| 6,696,948 B2 | * | 2/2004 | Thompson et al. ......... 340/561 |
| 2001/0034908 A1 | * | 11/2001 | Daly ............................. 5/713 |
| 2002/0106959 A1 | * | 8/2002 | Huffines et al. ............ 442/394 |

FOREIGN PATENT DOCUMENTS

| | | |
|---|---|---|
| WO | WO 01/59880 Aq | 8/2001 |
| WO | WO 01/59880 A1 | 8/2001 |
| WO | WO 01/86676 A1 | 11/2001 |

OTHER PUBLICATIONS

Billen, et al., "Occupant Classification System for Smart Restraint Systems", BNSDOCID: XP–2184965A 1.

* cited by examiner

Primary Examiner—Anjan Deb
Assistant Examiner—Hoai-An D. Nguyen
(74) Attorney, Agent, or Firm—Yen Tong Florczak (57) ABSTRACT

A breathable moisture barrier suitable for use in enclosing flexible electrodes, foam substrate and other electrical components within a substantially liquid impervious environment without significantly impairing the ability of electrical sensors to accurately measure temperature and humidity variations within the surrounding environment such as the seating compartment of an automobile. It is further disclosed that a breathable polymeric material having a sufficiently high moisture vapor transmission rate (MVTR) will permit water vapor to be transported across the barrier and quickly reach equilibrium within the enclosed seat sensor mat assembly and to allow the humidity compensation of the occupant sensing system to function correctly. The breathable moisture barrier of the present invention provides a sufficiently high MVTR to allow rapid humidity equilibration within the sensor mat so as to better track rapid changes in the passenger compartment environmental conditions upon starting the car and applying either air conditioning or heating.

31 Claims, 7 Drawing Sheets

BREATHABLE MOISTURE BARRIER FOR AN OCCUPANT SENSING SYSTEM

CROSS REFERENCE TO RELATED APPLICATION

This application claims priority to U.S. Provisional Patent Application No. 60/332,077, filed Nov. 20, 2001.

BACKGROUND OF THE INVENTION

1. Field of the Invention

The present invention relates generally to a breathable, moisture-seal fabric and, more particularly, to a water impervious, breathable moisture barrier enclosing a flexible electrode antenna assembly suitable for use in an occupant sensing system.

2. Background of the Invention

U.S. Pat. Nos. 5,914,610 and 5,936,412 disclose that the ability to determine the position, orientation or presence of a person within a defined space is important in applications ranging from medical treatments to safety and security. For applications where determining the position, orientation or presence of a person within a defined space is important, electrode sensor arrays have been developed to allow automatic monitoring of the defined space. Such sensor arrays and methods for resolving a presence in a defined space are taught in the above-referenced patents.

Although the method for resolving a presence or activity in a defined space using a sensor array is known, the ability to adapt those sensor arrays to a particular environment is not addressed in the prior art. Specifically, in uses where the sensor array is used to monitor or detect the presence or activity of a person, additional factors come into play which may greatly impact the ability of the sensor array to provide accurate electrical field readings. For example, an expected use of these sensor arrays and methods, as described in U.S. Pat. Nos. 5,914,610 and 5,936,412, is in an automobile seat for regulating the deployment of airbags. Additionally, commonly owned Patent Convention Treaty Application No. PCT/US01/04057 filed on Feb. 8, 2001, incorporated in its entirety herein, sets forth and describes a flexible electrode antenna having sufficient flexibility, comfort and durability for use in close proximity to an individual such as an automobile seat. However, it must be noted that none of these references adequately address the issue of preventing the absorption of liquids into the sensing system which significantly impairs the ability of the system to make occupant classification determinations.

Therefore, there is a need for a breathable moisture barrier enclosing the sensing system (consisting of electrode antennas, foam substrate and other electrical components) to provide a substantially liquid impervious seal while having a high enough level of breathability so as not to interfere with the readings of a temperature/humidity sensor located inside the seat sensor mat assembly.

SUMMARY OF THE INVENTION

The present invention provides a breathable moisture barrier suitable for use in enclosing flexible electrodes, foam substrate and other electrical components within a substantially liquid impervious environment without significantly impairing the ability of electrical sensors to accurately measure temperature and humidity variations within the surrounding environment such as the seating compartment of an automobile. The invention comprises a breathable polymeric material having a sufficiently high moisture vapor transmission rate (MVTR) to permit water vapor to be transported across the barrier and quickly reach equilibrium within the enclosed seat sensor mat assembly and to allow the temperature and humidity compensation of the occupant sensing system to function correctly. The breathable moisture barrier of the present invention provides a sufficiently high MVTR to allow rapid temperature and humidity equilibration within the sensor mat so as to better track rapid changes in the passenger compartment environmental conditions upon starting the car and applying either air conditioning or heating.

In one preferred embodiment, the breathable moisture barrier is a microporous, polypropylene film bonded to a polypropylene nonwoven. In alternative embodiments, other breathable polymeric fabrics or films having a sufficiently high MVTR, a suitable level of durability and other performance attributes required for car seat applications, including comfort, noise, flame retardancy, and thermal stability, may also be used.

As used herein, these terms have the following meanings:

1. The term "breathable" describes a material that is vapor permeable but liquid and particulate impermeable such as films used in garment and diaper applications.

2. The term "microporous" describes a material with a structure that enable fluids to flow through them and has an effective pore size that is at least several times the mean free path of the flowing molecules (from several microns down to 100 Angstroms).

BRIEF DESCRIPTION OF THE DRAWINGS

A more complete understanding of the present invention may be obtained by reference to the following Detailed Description when taken in conjunction with the accompanying drawings in which like reference numerals refer to like parts and wherein:

FIG. 4b is a detailed cutaway side view clearly showing the positioning of the temperature/humidity sensor within the seat sensor mat assembly shown in FIG. 4a;

DETAILED DESCRIPTION OF THE PREFERRED EMBODIMENT

Although those skilled in the art will readily recognize that multiple unique constructions may be created for use as a breathable moisture barrier in an occupant sensing system, the present invention is described herein primarily in relation to one preferred construction. In particular, the present invention is described herein as a foam mat having flexible sensor electrodes and a humidity/temperature sensor attached thereto, all enclosed within a breathable polymeric fabric laminate to render the apparatus substantially liquid impervious and having sufficiently high MVTR as to not interfere with the functioning of the sensor apparatus. Alternate constructions in addition to those described herein are considered within the scope and the spirit of the invention.

In one example of a seat sensor mat assembly for use in automotive applications, the assembly will consist of a number of electrically conductive sensor strips adhesively attached to the top and bottom surfaces of an open celled, flexible polyurethane foam core. Each sensor strip is connected to an electronic control unit which operates the occupant sensing system by measuring impedance changes in an electric field around each of the sensor strips based on an occupant's size and presence. The seat sensor mat assembly is designed to be incorporated into a hollowed out portion of the bottom cushion of an automobile seat.

Since the occupant sensing system uses electric field sensing technology, water or other liquids spilled on the seat could impair the ability of the sensing system to function properly. Water and other conductive liquids prevent the system from sensing occupant changes accurately because the conductive liquid creates coupling and shorts between adjacent conductive strips on the seat sensor mat assembly.

One solution to this problem would be to enclose the seat sensor mat assembly entirely within a liquid impervious polymeric film. This is much like wrapping or coating the seat sensor mat assembly with a non-porous, non-breathable polymer film to keep water out. However, this solution presents additional problems by creating very different environmental conditions, namely temperature and humidity, inside the seat sensor mat assembly and in the surrounding passenger compartment of the automobile. The dielectric properties of the materials and gases of the environment surrounding the conductive strips are temperature and humidity dependent. Sealing the entire assembly in a manner which is impervious to both liquids and gases make temperature and humidity compensation of the electric field data significantly more difficult. This solution may ultimately require a temperature and humidity sensor both inside the seat sensor mat assembly and externally within the passenger compartment. Comfortability issues may also arise as air that is trapped inside the sealing material will be unable to escape and will be compressed as the seat is compressed. It is also notable that should any moisture become trapped inside the seat sensor mat assembly, it is quite possible that it will create mildew and other nondesirable conditions inside the assembly. An additional comfort problem may arise from perspiration trapped in the seat trim that is in contact with the occupant.

Accordingly, a breathable moisture barrier would provide a number of advantages in an occupant sensing system. A breathable moisture resistant fabric can be used to create a positive seal of the open celled foam preventing water uptake. Additionally, breathability permits a uniform temperature and humidity environment between the seat sensor mat assembly and the passenger compartment. This uniform environmental condition allows a single temperature/humidity sensor to be incorporated into the seat sensor mat assembly to characterize the environment of both the assembly itself and the passenger compartment. Moreover, temperature and humidity compensation of the electric field data is made easier due to the consistent dielectric properties of the materials and gases within the seat sensor mat assembly, seat trim materials and the passenger compartment. A breathable moisture barrier should also prevent any moisture from collecting or mildewing in the seat sensor mat assembly, seat trim materials or seat bun. Although a breathable membrane will usually not allow a sufficient amount of air to escape from the seat sensor mat assembly as a passenger sits down, ventilation holes may be easily incorporated on the bottom surface of the assembly and a transfer adhesive, used to adhere the sensor mat to the seat bun may be further utilized at the edges of the ventilation holes to prevent moisture from entering the assembly.

Although any number of breathable moisture barrier films or fabrics are available, one preferred embodiment of the present invention would utilize a microporous polypropylene film laminated to a polypropylene nonwoven and available commercially as PROPORE brand fabric from the Minnesota Mining and Manufacturing Company (3M). See U.S. Pat. Nos. 4,539,256, 4,726,989, 4,902,553 and 5,238,623, incorporated herein by reference, for a more complete discussion on the physical properties and the manufacture of microporous polypropylene films. This particular film/nonwoven laminate offers a number of advantageous properties including relatively high moisture vapor transmission rates (MVTR of about 8,000 g/m$^2$ 24 hours), 345 kPa (50 psi)) water holdout, abrasion resistance due to the presence of the nonwoven layer, good bondability using acrylic transfer adhesives, and relatively low cost due to the use of polypropylenes as the base material in comparison to other moisture resistant breathable fabrics such as GORETEX available from W. L. Gore and Associates and based on polytretrafluroethylene polymers.

The film may contain adjuvants such as antioxidants, flame retardants and the like, to the extent that such adjuvants do not critically impair the moisture vapor transmission or mechanical properties of the film. Useful antioxidants include phenolic compounds such as pentaerythritol tetrakis(3-(3,5-di-tert-butyl-4-hydroxyphenyl)propionate), available as IRGANOX 1010, from CIBA Specialty Chemicals, and ANOX 20, available commercially from Great Lakes Chemical. Useful flame retardants include halogenated organic compounds, organic phosphorous-containing compounds, and inherently flame retardant compositions. Halogenated organic flame retardants include biphenyls such as 2,2'-dichlorobiphenyls, octabromodiphenyls, and halogenated diphenyl ethers containing from 2 to 10 halogen atoms. Useful organic phosphorus additives include phosphorous compounds such as phosphoric acids, phosphorous-nitrogen compounds, halogenated organic phosphorous compounds and the like. These can be used alone or mixed with e.g., chlorinated biphenyls or antimony oxide. Inherently flame retardant polymers are those which do not support combustion or are self-extinguishing. Examples include poly(vinyl choride), poly (vinylidine chloride), polyimides, polyether ketones, and the like. See U.S. Pat. No. 6,171,689, incorporated herein by reference, for further discussion of flame retardants. The adjuvants may be added individually or mixed together, e.g., flame retardant may be mixed with antioxidant and added together for the sake of simplifying process steps during manufacture. The nonwoven layer may also contain adjuvants such as antioxidants, and the like.

In one embodiment of the invention, the composition for the breathable moisture barrier film includes octabromodiphenyl oxide, available commercially from Great Lakes Chemical as DE-79.

Figure 1:
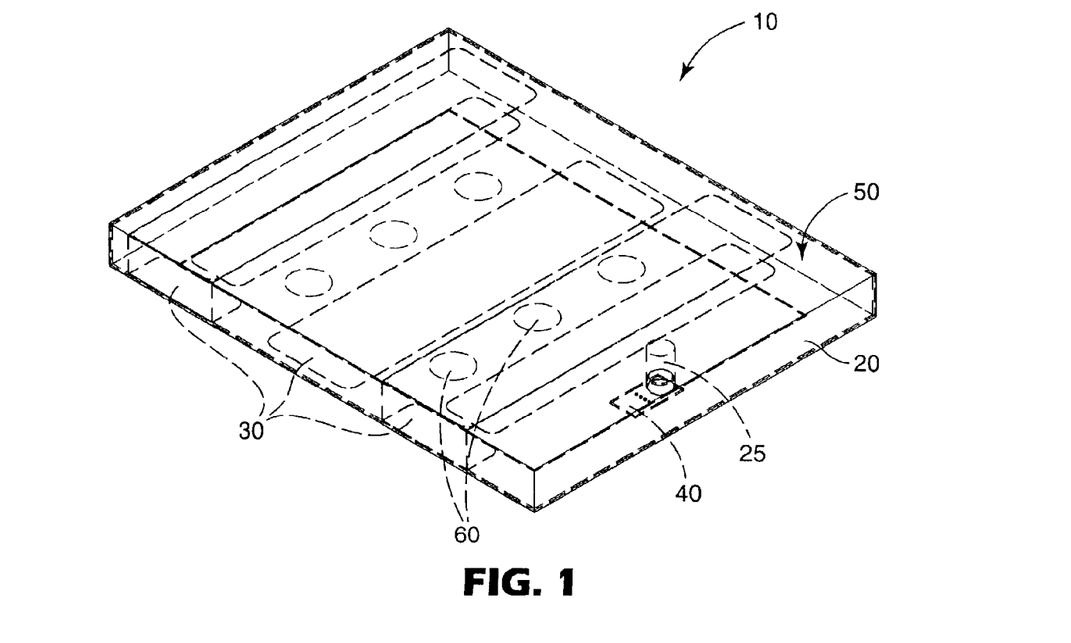
FIG. 1 is a perspective view of a seat sensor mat assembly featuring a foam mat, a flexible electrode antenna and a humidity/temperature sensing element all enclosed within a breathable moisture barrier constructed in accordance with one embodiment of the present invention.

Referring now to FIG. 1, a perspective view of a seat sensor assembly constructed in accordance with the present invention is shown. The seat sensor assembly 10 comprises a polyurethane foam core 20 a number of electrically conductive sensors 30 and a temperature/humidity sensing element 40 disposed within an opening 25 formed in the foam block 20 for measuring temperature and humidity changes both within the assembly and the interior of the automobile itself. The entire assembly 10 is then covered in a substantially liquid impervious, breathable fabric 50. Optionally, air ventilation holes 60 may be provided in the bottom of the assembly 10 to allow air to escape from the assembly 10 as an occupant sits on the seat cushion of the automobile. The breathable moisture barrier 50 may be adhered to the foam core 20 of the assembly 10 by an acrylic transfer adhesive, not shown.

Figure 2A:
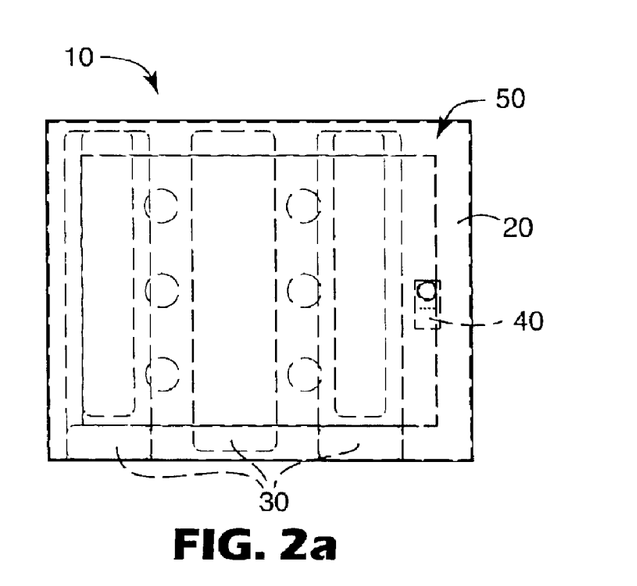
FIGS. 2a–c illustrate a top plan view, a side elevational view and a bottom view, respectively, of the seat sensor mat assembly in accordance with the embodiment of FIG. 1.
Figure 2B:
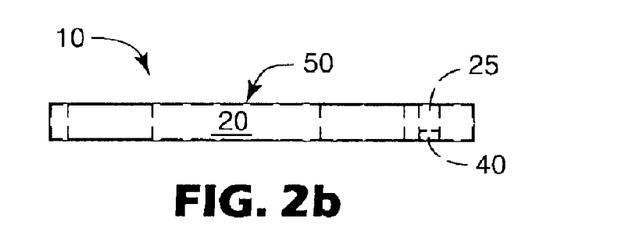
Figure 2C:
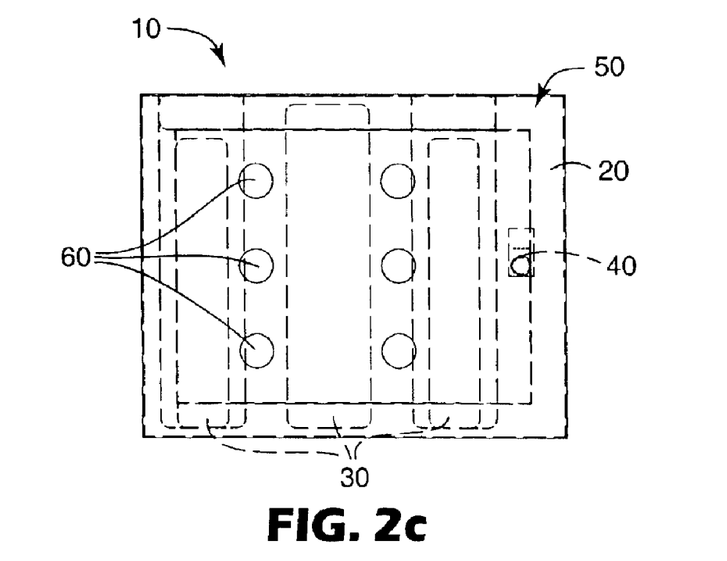

Referring now to FIGS. 2a–2c, a top plan view, a side elevational view and a bottom view, respectively, of the seat sensor assembly of FIG. 1 is shown. Note that FIGS. 2a–2c further illustrate the positioning of the electrically conductive sensor strips 30, the temperature/humidity sensor 40 and the air ventilation holes 60 in the seat sensor assembly.

Figure 3A:
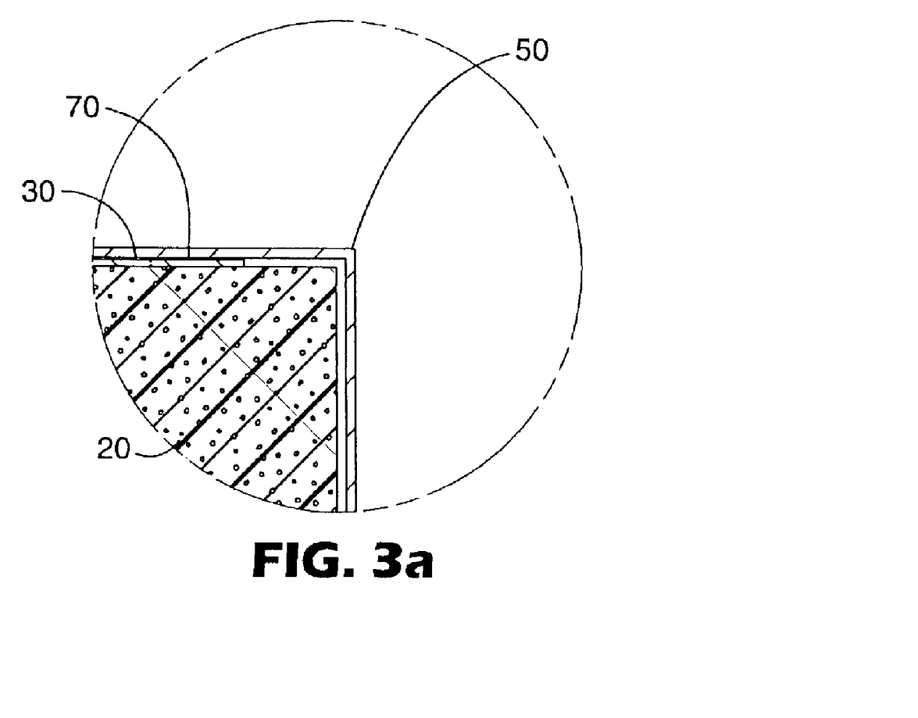
FIG. 3a is a detailed side elevational view illustrating construction features of the seat sensor mat assembly near a corner of the embodiment shown in FIG. 2b.
Figure 3B:
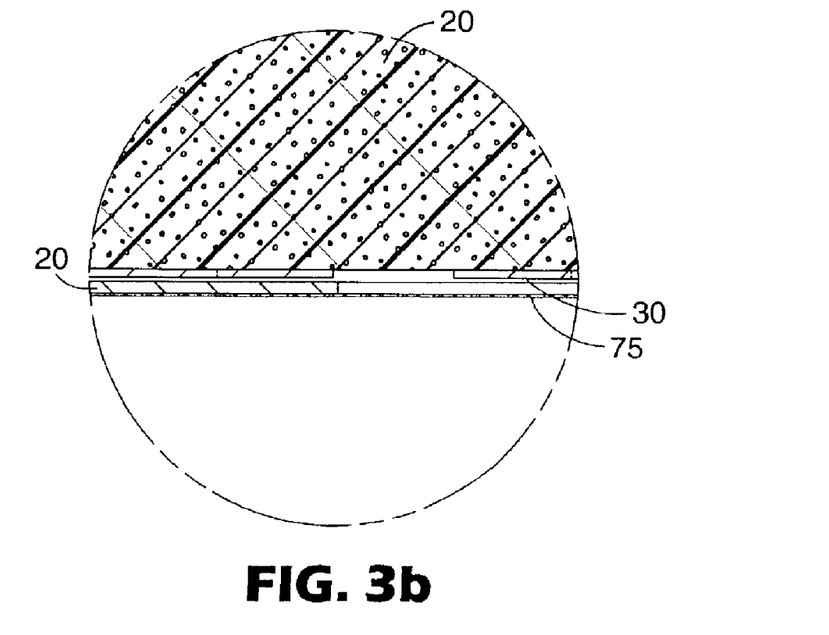
FIG. 3b is a detailed side elevational illustrating construction features of the seat sensor mat assembly along a bottom portion of the embodiment shown in FIG. 2b.

Referring now to FIGS. 3a–3b, detailed drawings are provided to better illustrate features of the side elevational view shown in FIG. 2b. In FIG. 3a, a detailed drawing of a corner portion of the seat sensor assembly constructed in accordance with the present invention is shown. Again, as with FIGS. 1–2c, there is a foam core 20 with electrically conductive sensors 30 and a barrier material 50 attached thereto by a layer of acrylic transfer adhesive 70. Similarly, FIG. 3b shows the foam core 20, the conductive electrodes 30, the barrier material 50 and a layer of transfer adhesive 75 on the underside of the barrier material to adhere it to a seat cushion, not shown.

Figure 4A:
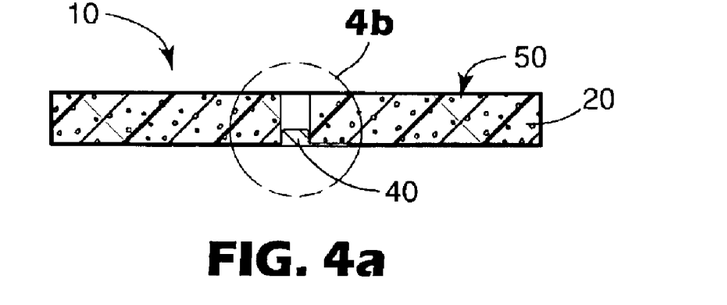
FIG. 4a is a cutaway side view of the seat sensor mat assembly taken along section line A—A.
Figure 4B:
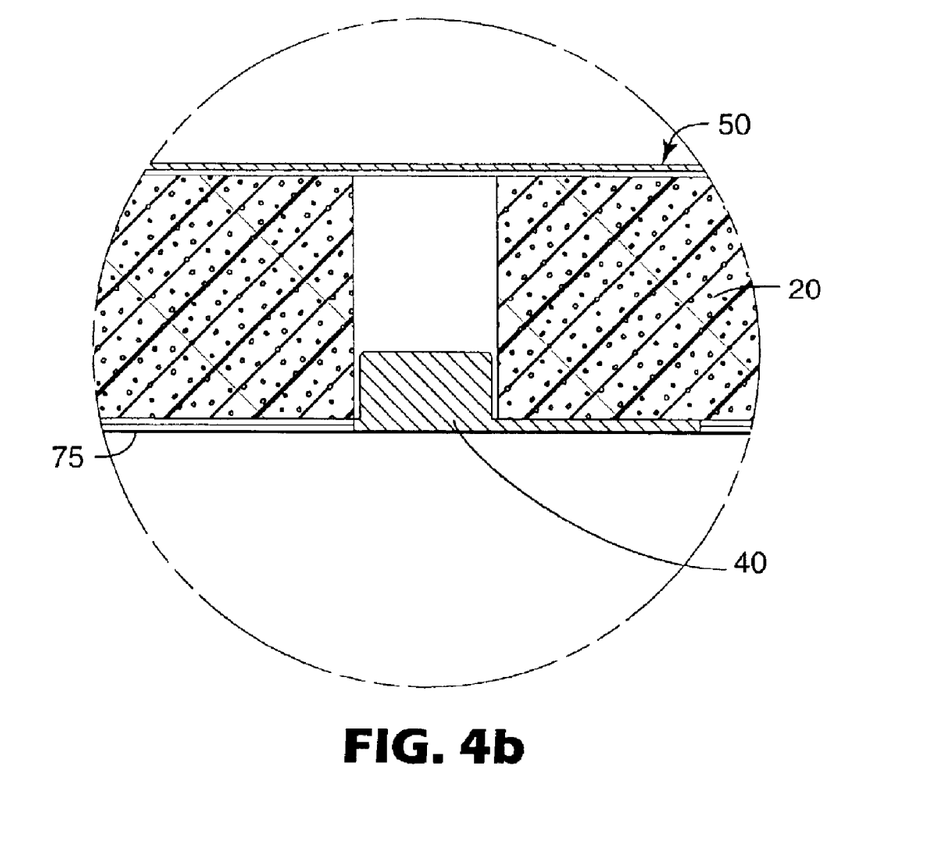

Referring now to FIG. 4a, a cutaway side elevational view taken along section line A—A is shown. This figure illustrates the positioning of the foam core 20, the opening in the foam core 25, the temperature/humidity sensor 40 and the barrier material 50. Similarly, FIG. 4b shows a detailed drawing of a portion of FIG. 4a and better illustrating the positioning of the foam core 20, the opening in the foam core 25, the temperature/humidity sensor 40, the barrier material 50 and the bottom layer of transfer adhesive 75, again used to attach the seat sensor mat assembly to a seat cushion, not shown.

Figure 5:
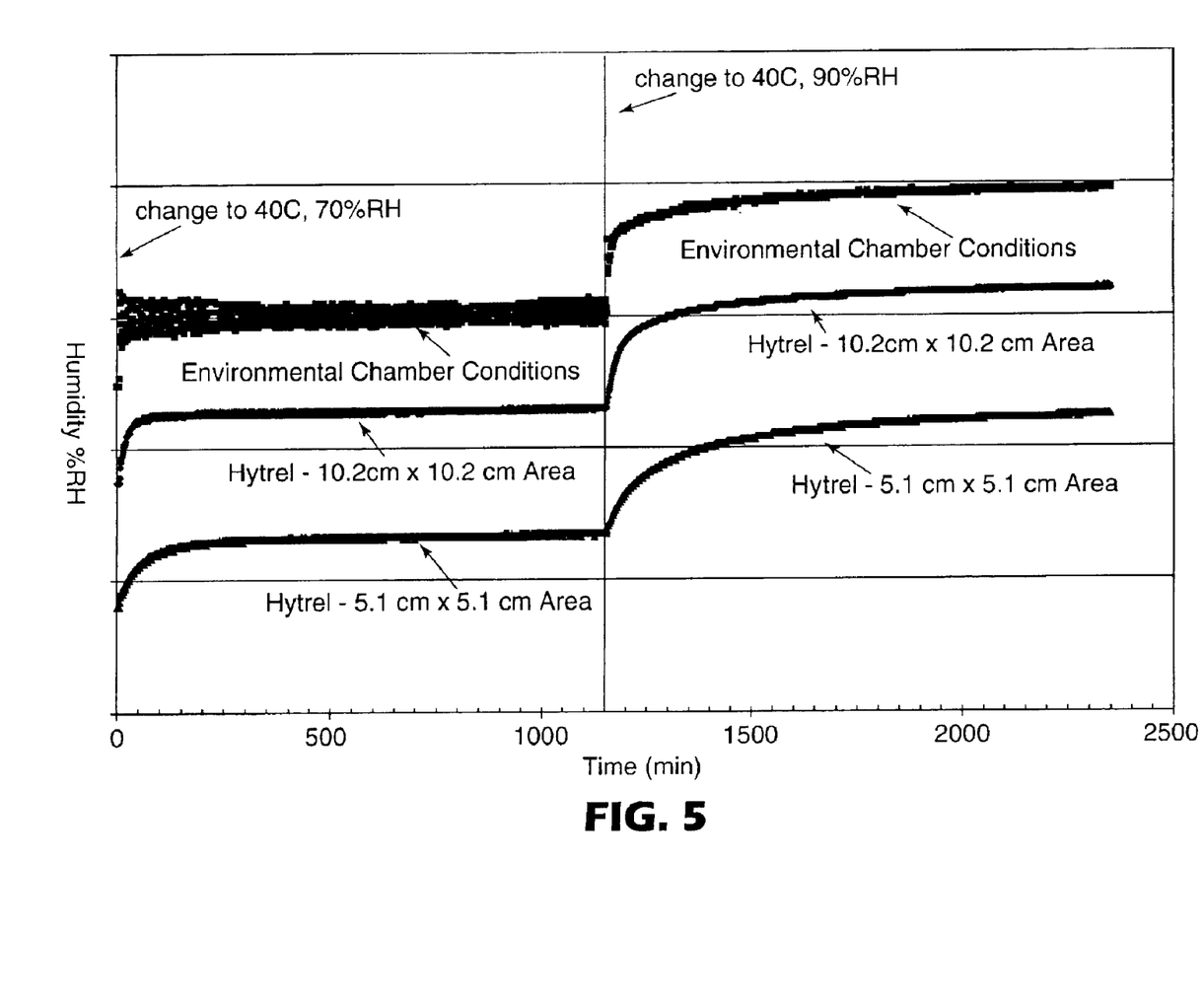
FIG. 5 is a series of offset graphs illustrating the effect of varying the breathable area on humidity sensor equilibrium time.

Referring now to FIG. 5, a series of offset graphs are presented to show test cell conditions at 70% relative humidity and then changing to 90% relative humidity at a steady temperature of 40° C. For this figure, the test cells were created by cutting an open celled polyurethane foam mat into a 10.2 cm×10.2 cm×1.9 cm (4 in×4 in×0.75 in) block having a central opening extending therethrough and fitted with a temperature/humidity sensor. The control test cell did not have any additional coverings. The upper surface of the moisture resistant test cells were covered with a Hytrel 4056 thermoplastic elastomer available form DuPont and having an MVTR value of about 400 g/m² 24 hr. The moisture resistant test cells were then sealed on the sides and bottom with a non-breathable polymer film. Additionally, to better investigate the influence of breathable surface area, it was possible to cover a portion of the top surface of the test cell to reduce the breathable area from a 10.2 cm×10.2 cm (4 in×4 in) square to a 5.1 cm×5.1 cm (2 in×2 in) square.

As shown in FIG. 5, the uncovered foam cell, noted here as environmental chamber conditions, came to equilibrium almost immediately and had a distribution of humidity readings about the set points of 70% and 90% relative humidity. The Hytrel covered foam test cells were then tested in both 5.1 cm×5.1 cm (2 in×2 in) and 10.2 cm×10.2 cm (4 in×4 in) configurations. The 5.1 cm×5.1 cm (2 in×2 in) test cell exhibited large differences from the environmental chamber conditions after the initial change in the relative humidity set points and a long equilibration time to reach the actual environmental conditions. By comparison, the 10.2 cm×10.2 cm (4 in×4 in) test cell exhibited much smaller differences from the environmental chamber conditions after changing the set point and reached equilibrium approximately 4 times faster than the 5.1 cm×5.1 cm (2 in×2 in) test cell. This demonstrates the influence of breathable area on the ability of the humidity sensor to track changes in environmental conditions.

Figure 6:
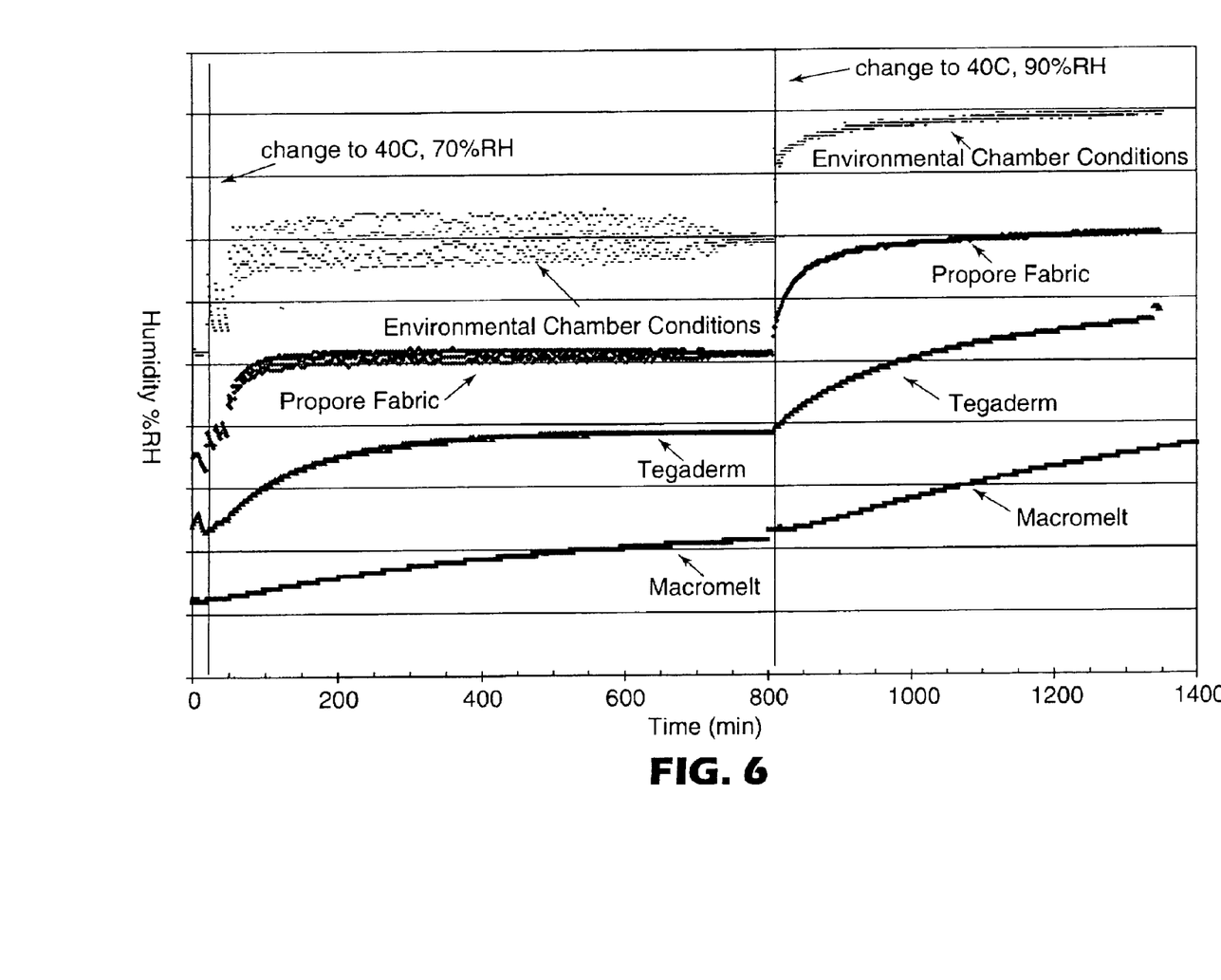
FIG. 6 is a series of offset graphs illustrating the effect of using different commercially available polymeric materials having varying levels of MVTR on humidity sensor equilibrium time.

Referring now to FIG. 6, another series of offset graphs showing the effects of MVTR on humidity sensor equilibrium time is shown. The test cells were produced much like the Hytrel 4056 cells above with 5.1 cm×5.1 cm (2 in×2 in) breathable surfaces of Macromelt 6239, Tegaderm, and Propore KN-2311 having the properties noted in Table 1.

TABLE 1

| Material | Purpose | Construction | Thickness $\mu$m (mil) | MVTR (g/m² 24 hr) |
|---|---|---|---|---|
| Hytrel 4056 (DuPont) | Breathable Film | Thermoplastic polyester elastomer | 25.4 (1) | 400 |
| Propore KN-2311 (3M) | Breathable Fabric | Microporous polypropylene film/ polypropylene nonwoven | 356 (14) (1.5 mil film + 12.5 mil nonwoven) | 8,000 |
| Tegaderm (3M) | Breathable Film | Polyethylene | 38 (1.5) | 90 |
| Macromelt 6239 (Henkel) | Non-breathable Film | Polyamide | 152 (6) | less than 10 |

Note that at 70% relative humidity, the Macromelt covered sample does not appear to reach equilibrium, the Tegaderm covered sample takes about 500 minutes to reach equilibrium whereas the Propore fabric covered material reaches equilibrium in a matter of several minutes and closely tracks the data of the test chamber itself. These results are again mirrored as the relative humidity is increased to 90% at a time of about 800 minutes. Again, it is clear that the Propore fabric having the greatest MVTR most closely tracks the change in environmental chamber conditions.

Figure 7:
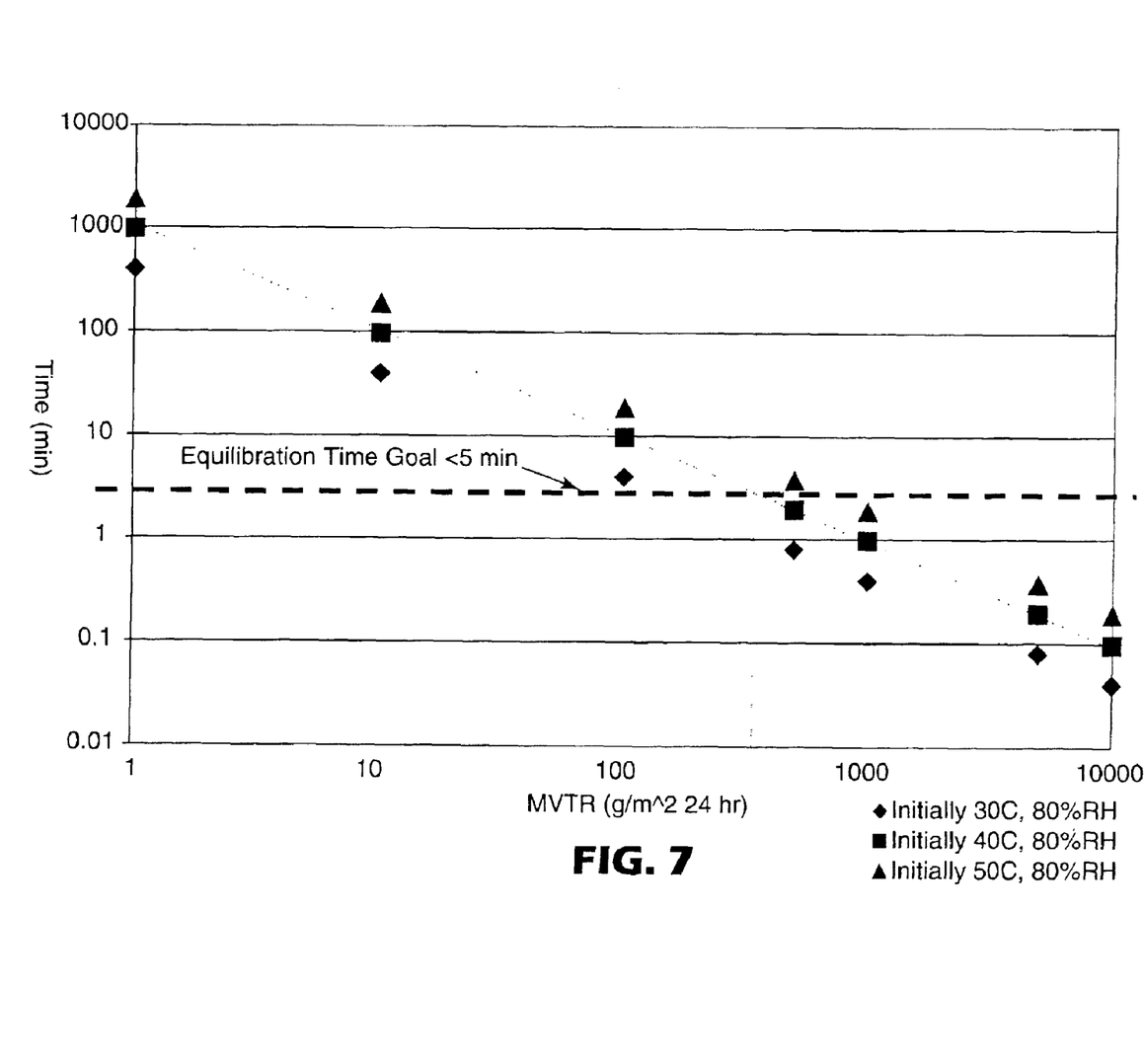
FIG. 7 is a logarithmic chart illustrating the theoretically calculated time required to reach equilibrium at 25° C. and 50% relative humidity as a function of the MVTR.

Referring now to FIG. 7, a graph illustrating the theoretically calculated equilibrium time to reach temperature of 25° C. and 50% relative humidity inside a 40.6 cm×40.6 cm×1.9 cm (16 in×16 in×0.75 in) seat sensor mat assembly from various initial environmental conditions as a function of the MVTR is shown. For automotive seat applications, it would be desirable to have equilibration time of less than about five minutes, and more preferably less than about 1 minute, so as to better track rapid changes in the passenger compartment environmental conditions upon starting the car and applying either air conditioning or heating. As shown here graphically, at initial conditions of 80% relative humidity and temperatures of 30° C., 40° C. and 50° C., there is a straightforward logarithmic relationship between the MVTR value and the time required for the seat sensor mat assembly to reach equilibrium conditions of 25° C. and 50% relative humidity. To reach an equilibrium time goal of less than five minutes, the minimum MVTR value falls somewhere between 100 and 1000 g/m² 24 hours and, more specifically, in a range of about 400 to 600 g/m² 24 hours. Obviously, a material having a particularly high MVTR value of about 8,000 g/m² 24 hours can reach equilibrium in significantly less than five minutes or as shown here, about 0.1 minutes. This theoretical value is based on a calculation using only the 40.6 cm×40.6 cm (16 in×16 in) top surface of the 1.9 cm (0.75 in) thick assembly as the breathable area. However, increasing the breathable surface area by, for example, making the bottom surface breathable or increasing the overall volume by, for example, increasing thickness will have a significant impact on the equilibration time. Note that, for ease of comparison, the data shown in FIG. 7 have been further summarized in Table 2, as shown below.

TABLE 2

Equilibration Time to 25 C, 50% RH

| Initial Condition: MVTR (g/m²/24 hours) | 30 C, 80% RH Time (min) | 40 C, 80% RH Time (min) | 50 C, 80% RH Time (min) |
|---|---|---|---|
| 1 | 399.5 | 972.0 | 1877.8 |
| 10 | 39.9 | 97.2 | 187.8 |
| 100 | 4.0 | 9.7 | 18.8 |
| 500 | 0.8 | 1.9 | 3.8 |
| 1000 | 0.4 | 1.0 | 1.9 |
| 5000 | 0.1 | 0.2 | 0.4 |
| 10000 | 0.0 | 0.1 | 0.2 |

Although preferred embodiments of the invention have been described in the examples and foregoing description, it will be understood that the invention is not limited to the embodiments disclosed, but is capable of numerous rearrangements and modifications of the parts and elements without departing from the spirit of the invention, as defined in the following claims. Therefore, the spirit and the scope of the appended claims should not be limited to the description of the preferred embodiments contained herein.

What is claimed is:

1. A seat sensor mat assembly comprising:
an insulating foam substrate;
at least one electrically conductive sensing element adhered to the foam substrate;
a humidity sensor disposed within the foam substrate; and
a substantially liquid impervious, vapor permeable material covering at least a portion of the foam substrate;
wherein the substantially liquid impervious, vapor permeable material has a moisture vapor transmission rate sufficient to permit humidity on opposite sides of the material to reach equilibrium in less than about five minutes.

2. The seat sensor mat assembly of claim 1, wherein the substantially liquid impervious, vapor permeable material is a microporous film/nonwoven polymer laminate.

3. The seat sensor mat assembly of claim 1, wherein said vapor permeable material has a moisture vapor transmission rate of at least about 100 g/m²/24 hours.

4. The seat sensor mat assembly of claim 3, wherein said vapor permeable material has a moisture vapor transmission rate of at least about 500 g/m²/24 hours.

5. The seat sensor mat assembly of claim 1, wherein said vapor permeable material has a moisture vapor transmission rate of at least about 1000 g/m²/24 hours.

6. The seat sensor mat assembly of claim 2 wherein microporous material comprises a polyolefin film.

7. The seat sensor mat assembly of claim 6 wherein said polyolefin is a polypropylene.

8. The seat sensor mat assembly of claim 2 wherein nonwoven material bonded to said polyolefin film also comprises a polyolefin.

9. The seat sensor mat assembly of claim 8 wherein said nonwoven material is a polypropylene.

10. The seat sensor mat assembly of claim 1, wherein said vapor permeable material covers at least about 5% of the surface area of the foam substrate.

11. The seat sensor mat assembly of claim 10, wherein said vapor permeable material covers at least about 25% of the surface area of the foam substrate.

12. The seat sensor mat assembly of claim 1, wherein said vapor permeable material covers an aperture of at least about 5 cm×5 cm.

13. The seat sensor mat assembly of claim 1 wherein said liquid impervious, vapor permeable material further comprises a flame retardant.

14. The seat sensor mat assembly of claim 13 wherein said flame retardant is selected from the group consisting of organic phosphorous materials, halogenated biphenyls, and phenolic compounds.

15. The seat sensor mat assembly of claim 14 wherein said flame retardant is octabromodiphenyl oxide.

16. The seat sensor mat assembly of claim 1 wherein said liquid impervious, vapor permeable material further comprises an antioxidant.

17. The seat sensor assembly of claim 16 wherein said antioxidant is pentaerythritol tetrakis (3,5-di-tert-butryl-4-hydroxyphenyl)propionate).

18. A sensing system for detecting at least two different conditions having a breathable moisture barrier comprising
at least one electrically conductive sensing element adhered thereto;
a humidity sensor disposed within the foam substrate; and
a substantially liquid impervious, vapor permeable material covering at least a portion of the foam substrate,
wherein said vapor permeable material has a moisture vapor transmission rate sufficient to permit humidity on opposite sides of the material to reach equilibrium in less than about five minutes.

19. The sensing system of claim 18, wherein the substantially liquid imperious, vapor permeable material is a microporous film/nonwoven polymer laminate.

20. The sensing system of claim 18, wherein said vapor permeable material has a moisture vapor transmission rate of at least about 500 g/m²/24 hours.

21. The sensing system of claim 18, wherein said vapor permeable material has a moisture vapor transmission rate of at least about 1000 g/m²/24 hours.

22. The sensing system of claim 18, wherein said vapor permeable material covers at least about 5% of the surface area of the foam substrate.

23. The sensing system of claim 22, wherein said vapor permeable material covers at least about 25% of the surface area of the foam substrate.

24. The sensing system of claim 18 wherein said sensing system is used in a seat.

25. The sensing system of claim 24 wherein said seat is an automotive seat.

26. The sensing system of claim 18 wherein said two conditions are presence of a weight load and absence of a weight load.

27. The sensing system of claim 18 wherein at least one of said two conditions is selected from the group consisting of presence of at least one occupant, size of occupant, location of occupant, motion of occupant, gender of occupant, and presence of more than one occupant.

28. A seat sensor assembly comprising:

a foam substrate;

a substantially liquid impervious, vapor permeable material covering at least a portion of the foam substrate, the vapor permeable material defining a boundary between an interior of the assembly and an exterior of the assembly;

at least a humidity sensor disposed within the interior of the assembly;

wherein the substantially vapor permeable material has a moisture vapor transmission rate sufficient to permit a humidity level in the interior of the assembly to reach equilibrium with a humidity level on the exterior of the assembly in less than about five minutes.

29. The seat sensor assembly of claim 28, wherein the substantially vapor permeable material has a moisture vapor transmission rate sufficient to permit a humidity level in the interior of the assembly to reach equilibrium with a humidity level on the exterior of the assembly in less than about one minute.

30. The seat sensor assembly of claim 28, wherein the vapor permeable material has a moisture vapor transmission rate of at least about 500 $g/m^2/24$ hours.

31. The seat sensor assembly of claim 29, wherein the vapor permeable material has a moisture vapor transmission rate of at least about 1000 $g/m^2/24$ hours.

* * * * *

UNITED STATES PATENT AND TRADEMARK OFFICE
CERTIFICATE OF CORRECTION

PATENT NO. : 6,906,534 B2  Page 1 of 1
DATED : June 14, 2005
INVENTOR(S) : Hoisington, Mark A.

It is certified that error appears in the above-identified patent and that said Letters Patent is hereby corrected as shown below:

<u>Title page,</u>
Item [56], References Cited, U.S. PATENT DOCUMENTS, delete "H002011" and insert -- H0,002,011 --.

<u>Column 4,</u>
Line 37, delete "polytretrafluroethylene" and insert -- polytetrafluroethylene --.

<u>Column 8,</u>
Line 42, delete "imperious" and insert -- impervious --.

Signed and Sealed this

Eleventh Day of April, 2006

JON W. DUDAS
*Director of the United States Patent and Trademark Office*